United States Patent
Malcolm et al.

(10) Patent No.: US 6,801,612 B2
(45) Date of Patent: Oct. 5, 2004

(54) SYSTEM AND METHOD FOR CONFERENCE CALL CONSOLIDATION

(75) Inventors: Jerry W. Malcolm, Austin, TX (US); Cornell G. Wright, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 10/302,521

(22) Filed: Nov. 21, 2002

(65) Prior Publication Data

US 2004/0101119 A1 May 27, 2004

(51) Int. Cl.[7] ............................................... H04M 3/42
(52) U.S. Cl. ................................. 379/202.01; 370/260
(58) Field of Search ..................... 379/202.01, 206.01, 379/198, 207.01; 370/260, 261, 537, 538

(56) References Cited

U.S. PATENT DOCUMENTS

| | | | | |
|---|---|---|---|---|
| 4,112,258 A | * | 9/1978 | Alles ............................ | 179/15 |
| 5,563,882 A | * | 10/1996 | Bruno et al. ................... | 370/62 |
| 5,978,014 A | * | 11/1999 | Martin et al. .................. | 348/15 |
| 6,671,262 B1 | * | 12/2003 | Kung et al. .................. | 370/260 |
| 2003/0223562 A1 | * | 12/2003 | Cui et al. .............. | 379/292.01 |

* cited by examiner

Primary Examiner—Creighton Smith
(74) Attorney, Agent, or Firm—Mark S. Walker; Gregory K. Goshorn; Hulsey Grether & Fortkort, LLP

(57) ABSTRACT

Provided is a system and method for consolidating telephone calls from more than one individual to a single, remote conference call provider through a telephone switch such that the multiple calls utilize a single telephone connection between the individuals' location and the conference call provider. A private branch exchange (PBX) or other type of switch detects attempts by multiple local callers to reach a designated conference call number and multiplexes those calls. In one embodiment, at least one of the conference call participants is coupled to the switch via a network, such as the Internet, using an Internet protocol (IP) telephone connection.

21 Claims, 4 Drawing Sheets

FIGURE 4      400
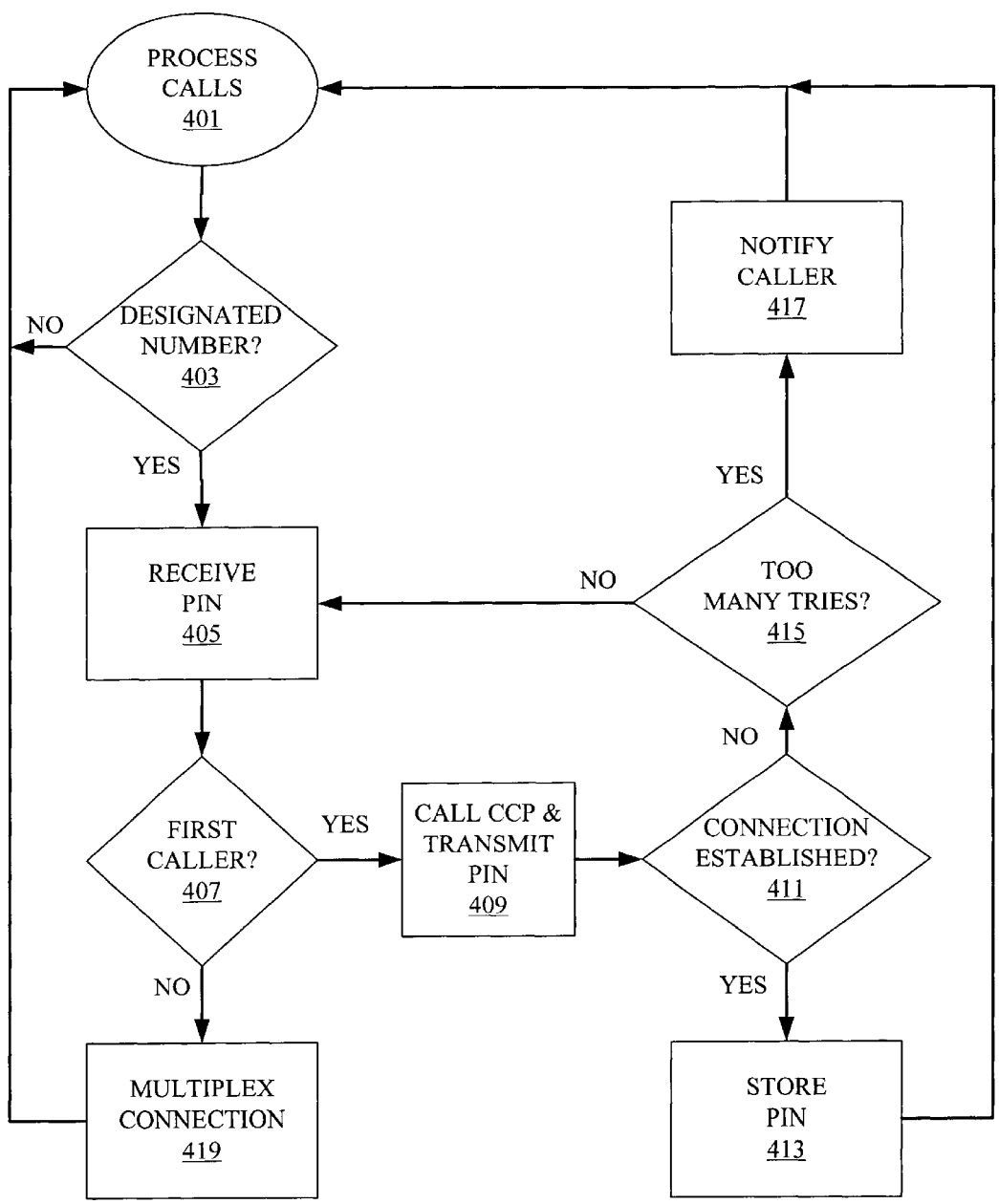

SYSTEM AND METHOD FOR CONFERENCE CALL CONSOLIDATION

TECHNICAL FIELD

The present invention relates generally to conference call consolidation and, more specifically, to a system that combines connections from multiple callers in a particular conference call into a single connection to a remote location.

BACKGROUND OF THE INVENTION

Business is frequently conducted by groups of individuals. If these individuals are not located in a single geographic location, some or all the individuals often must travel to a chosen location in order to attend a meeting. In order to eliminate the time and expense of people traveling in order to attend a meeting, teleconferencing has been developed.

Teleconferencing is a system in which individuals conduct a meeting by means of telephones or other communication devices. Typically, each individual is connected to a conference call provider by means of an individual connection. or, in the alternative, groups of individuals at a specific location meet in a particular conference room and share a single telephone connection using one or more microphones and speakers. A designated conference call provider provides each participant or group with a telephone number and a pin number. After dialing the telephone number and entering the pin number, each participant is connected to the specific conference call and the teleconference meeting, hosted by the conference call provider, commences. Frequently, each of a number of individuals at a specific location remain in their respective offices and establish individual connections between the location and the conference call provider hosting their conference call. Currently, one way for a group of people to share a connection is by meeting in a particular room and sharing a single telephone. Another way is by having one participant connect to the remote conference call provider, then manually establish a conference call on the local switch with the other local participants. Both of these methods need to be setup in advance by the local participants.

Participants at a specific location that choose to establish individual connections each call the conference number, enter the pin number and then are provided their own connection between their telephone and the conference call provider. In other words, each individual employs a separate connection established over its own outside line to the conference call provider. This system unnecessarily monopolizes available connections to the participants' business facility and may increase the expense of the conference call by incurring multiple telephone charges.

SUMMARY OF THE INVENTION

Provided is a system and method for consolidating multiple telephone calls from more than one individual to a single, remote conference call provider through a telephone switch such that the multiple calls all utilize a single telephone connection between the individuals' location and the conference call provider. In one embodiment, a private branch exchange (PBX) detects attempts by multiple local callers to reach a designated conference call number and multiplexes those calls through a single telephone connection to the conference call provider. Once a first call to a conference call provider is detected, the PBX waits for or requests the entry of a pin number corresponding to a particular conference call. Following entry of the pin number, a connection to the conference call provider is established, the user is connected to the conference call via the connection, and the PIN is stored in memory. Subsequent callers to the conference call are multiplexed into the connection provided that a PIN input by the subsequent caller matches the PIN stored in memory. In this manner, a conference call attended by multiple callers, each originating from a single local switch such as a PBX, only requires a single telephone connection between the PBX and the conference call provider. In addition, the conference call setup does not require any advance preparation other than the distribution of the telephone number and the PIN to potential participants.

In an alternative embodiment, each local participant to the conference call is provided with a temporary, local telephone number, valid only for entry into the conference call. In this embodiment, the temporary number is internal to the PBX and the separate entry of a pin number is unnecessary, unless required to validate a particular conference call participant. Once a participant is validated, if necessary, the participant's telephone connection is multiplexed into a single connection to the conference call provider.

In another embodiment, the local switch is implemented in a computer and at least one of the conference call participants communicates via a network such as the Internet using an Internet protocol (IP) telephone connection. The IP telephone connection is then multiplexed with other IP telephone connections and/or standard calls to the switch and, again, a single connection is provided between the participants' location and the conference call provider. In this and the previously described embodiments, the first caller to a particular conference call establishes the original connection to the conference call provider and later callers are multiplexed into this connection.

In addition to saving money on telephone line charges, multiple telephone lines into and out of the local switch are not tied up, thus providing a higher bandwidth for the switch or computer than is otherwise possible. Further, since some conference call providers charge a fee based upon the number of connections to a particular conference call rather than the number of callers, the charge for the conference call may be reduced as well.

BRIEF DESCRIPTION OF THE DRAWINGS

A better understanding of the present invention can be obtained when the following detailed description of the disclosed embodiments is considered in conjunction with the following drawings, in which:

FIG. 4 is a flow chart showing an exemplary method of processing calls according to the techniques of the present invention.

DETAILED DESCRIPTION OF THE PREFERRED EMBODIMENT

Although described with particular reference to a private branch exchange (PBX), the call consolidation system and method of the disclosed embodiments can be implemented in any local telephone switch in which minimizing outgoing call traffic is desirable. Those with skill in the computing and telephony arts will recognize that the disclosed embodiments have relevance to a wide variety of telephone switching platforms in addition to those described below. Further, the call conferencing system of the present invention can be implemented in software, hardware, or a combination of software and hardware. The hardware portion can be implemented using specialized logic; the software portion can be stored in a memory and executed by a suitable instruction execution system such as a microprocessor.

Figure 1:
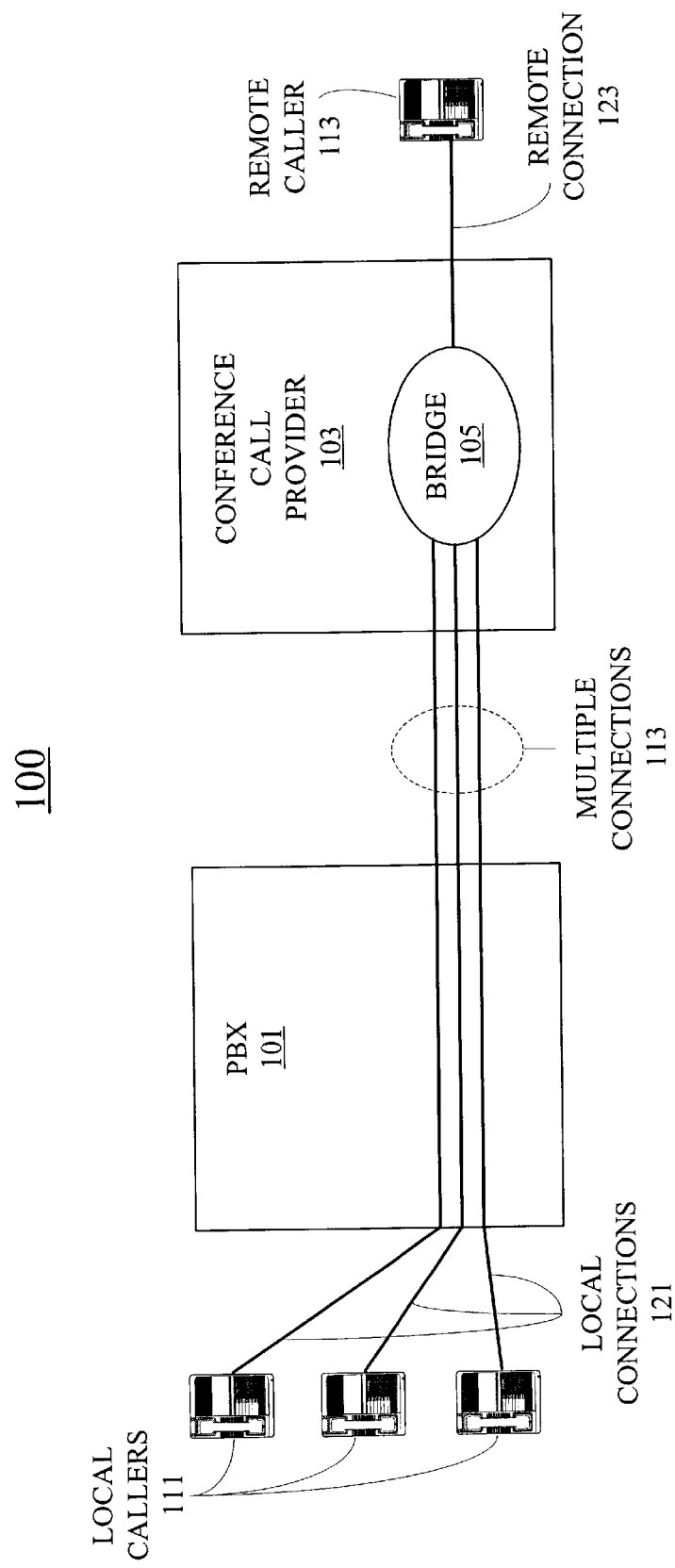
FIG. 1 is a block diagram of a typical call conferencing system.

FIG. 1 is a block diagram of a typical call conferencing system 100 in which a conference call provider 103 provides the resources necessary for multiple callers from different locations to conduct a conference call. In this example, a number of local callers 111 are teleconferenced with a remote caller 113. Local callers 111 employ a corresponding number of local connections 121, via a private branch exchange (PBX) 101 and multiple connections 113, to connect to a bridge 105, a resource provided by conference call provider 103. Remote caller 123 employs a remote connection 123 to connect to bridge 105. Each local connection 121 is connected, via PBX 101, to a single one of multiple connections 113, which are provided between PBX 101 and conference call provider 103. Conference call system 100 requires multiple connections 113, equal in number to local connections 121, for connecting local callers 111 to the conference call.

Although in this example local callers 111 and remote caller 113 can successfully conduct the conference call, scarce bandwidth in the form of multiple connections 113, which are, in this example, telephone lines between PBX 101 and conference call provider 103, must be used. In addition to reducing available incoming lines to PBX 101, call conferencing system 100 may generate unnecessary telephone charges, particularly if the multiple connections 113 between PBX 101 and conference call provider 103 are long distance.

Figure 2:
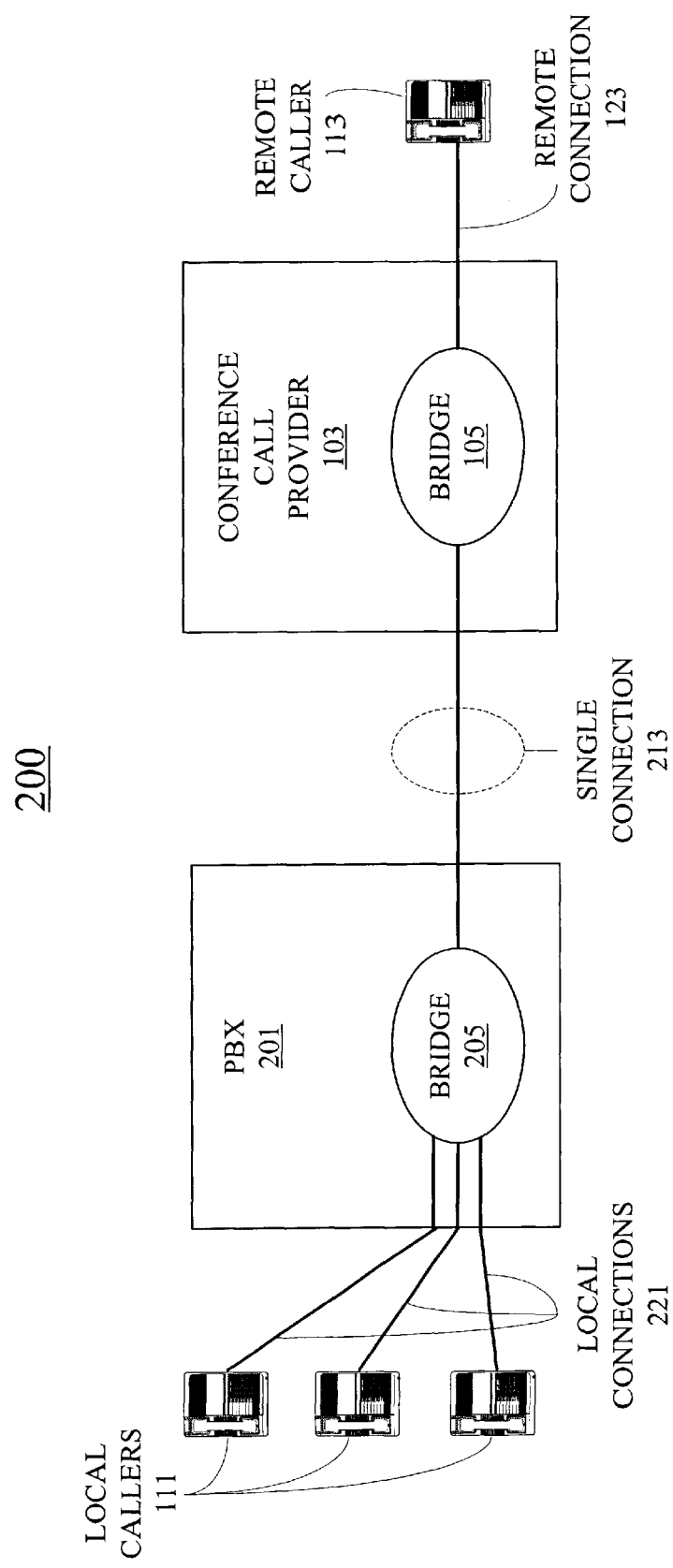
FIG. 2 is a block diagram of a call conferencing system implementing the techniques of the present invention.

FIG. 2 is a block diagram of a call conferencing system 200 implementing the techniques of the present invention. Conference call provider 103, bridge 105, remote caller 113, remote connection 123 and local callers 111 are the same as those described above in conjunction with FIG. 1. A PBX 201 incorporates the techniques of the present invention. It should be noted that PBX 201 is only an example of the type of equipment that can implement the disclosed techniques. The PBX 201 includes a bridge 205. Local callers 111 are connected to bridge 205 via local connections 221, with each local caller 111 employing a single connection of connections 221. PBX 201 and bridge 205 employ a process, described in more detail below in conjunction with FIG. 4, to multiplex local connections 221 into a single connection 213 between PBX 201 and bridge 105 of conference call provider 103.

Once connection 213 is established, conference call provider 103 employs bridge 105 to establish a conference call among local callers 111 and remote caller 113. Of course, there may be multiple remote callers such as remote caller 113. In this specific example, conference call provider 103 need only be aware of two connections, connection 213 and remote connection 123. The techniques of the disclosed embodiments, in addition to being applicable to a number of local switch types, can be utilized with different conference call providers, regardless of whether a particular provider is configured as illustrated in FIGS. 1, 2 and 3.

Figure 3:
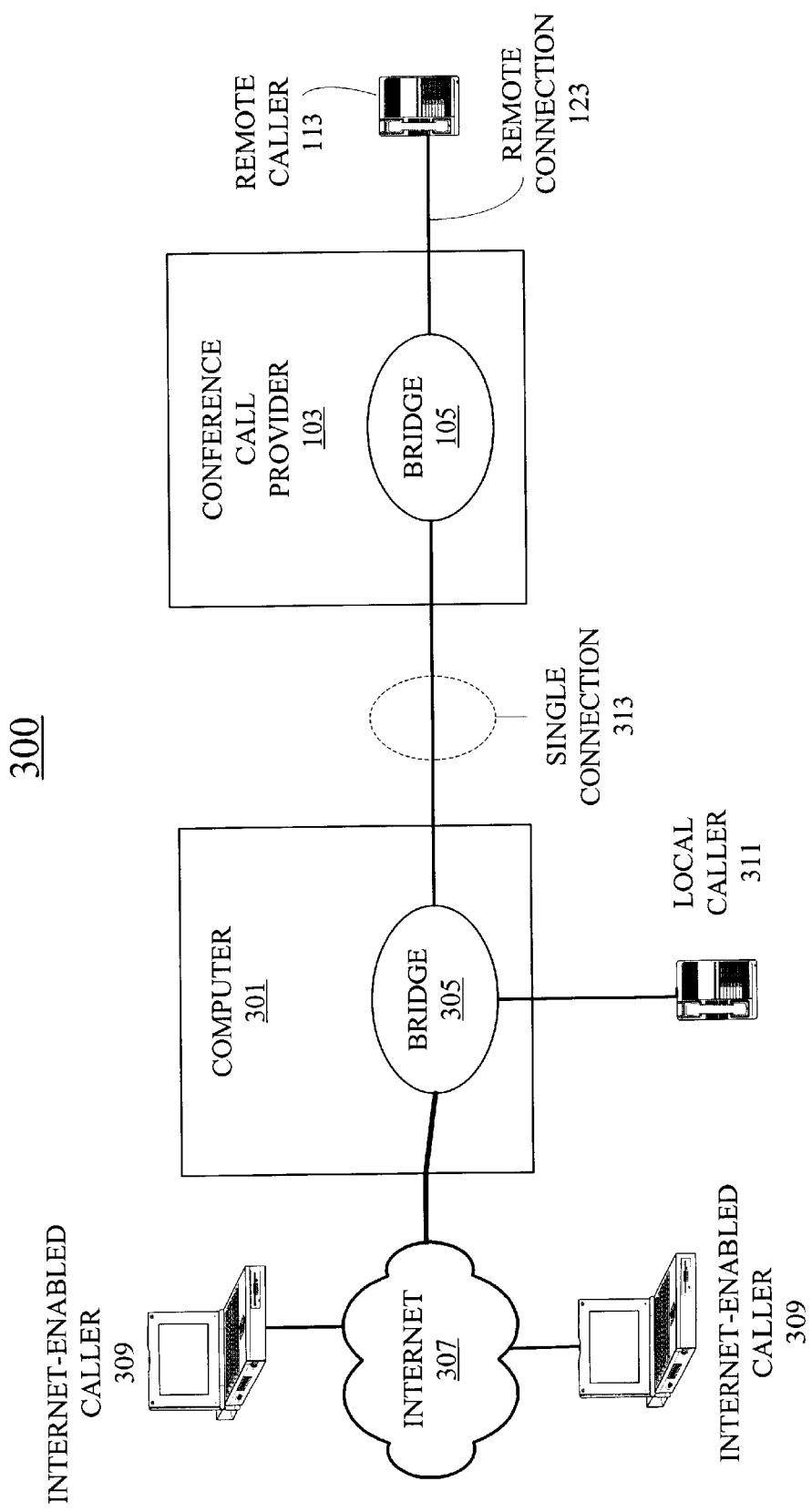
FIG. 3 is a block diagram of an alternative embodiment that includes provisions for Internet-enabled calls.

FIG. 3 is a block diagram of an Internet-enabled call conferencing system 300, which employs a computing system 301 in conjunction with the Internet 307. Conference call provider 103, bridge 105, remote caller 113 and remote connection 123 are the same as described above in conjunction with FIGS. 1 and 2. In this embodiment, computer 301 includes a bridge 305 and is connected to the Internet 307. Two Internet-enabled callers 309 are communicatively coupled to computer 301 via the Internet 307. Those with skill in the computing and telephony arts should be familiar with both the Internet and Internet protocol (IP) telephone calls. Computer 301 and bridge 305 multiplex Internet-enabled callers 309 into a single connection 313 between computer 301 and conference call provider 103, like PBX 201 and bridge 205 multiplex local callers 111 as explained above in conjunction with FIG. 2. Of course, there may be more than two Internet-enabled callers 309, one or more local callers such as a local caller 311 and multiple remote callers such as remote caller 113.

FIG. 4 is a flow chart showing an exemplary "Call Processing" process 400 that implements the techniques of the present invention. Process 400 starts in a "Process Calls" step 401 in which, for the sake of an example, PBX 201 (FIG. 2) is receiving and forwarding telephone calls. Once a call is received from a user, e.g. one of the local callers 111 (FIG. 2), control proceeds to a "Designated Number?" step 403 in which the PBX 201 compares the destination number received from a specific local caller 111 and compares the number with a list of designated conference call numbers. The list of designated conference call numbers is entered into the memory (not shown) of PBX 201 by an operator or technician responsible for updating and/or maintaining PBX 201. Each number in the list is the number of a known conference call provider.

If in step 403 the received number is not one designated as a conference call number, control returns to step 401 in which PBX 201 processes the call normally, i.e. routes the call to the designated destination. If the received number is a number that has been designated as a conference call number, then control proceeds to a "Receive Pin" step 405 in which process 400 either requests or waits for the entry of a personal identification number (PIN). In the alternative, local PBX numbers are established and stored in the memory of PBX 201 by the operator or technician specifically for the setup of a particular conference call, wherein each local PBX number is associated with the telephone number of a conference call provider and a valid, corresponding PIN. Each participant of the conference call is then provided with one of the local PBX numbers. In this manner, each local caller 111 provided with a local PBX telephone number corresponding to a particular conference call connects to the particular conference call simply by calling the local number, without the need for entry of a PIN.

Once a PIN has been input in step 405, control proceeds to a "First Caller?" step 407 in which process 400 determines whether the call is the first call to a particular conference call number and PIN. Although a particular conference call number may host multiple distinct conference calls, the conference call number and a PIN uniquely identify a specific conference call. In addition, the PIN input in step 405 functions as a validator to ensure that only authorized callers are consolidated into the specific conference call corresponding to the destination number and the PIN. If the caller is the first call with a particular conference call number and PIN, then control proceeds to a "Call Conference Call Provider (CCP) & Transmit Pin" step 409 in which PBX 201 makes a connection 213 (FIG. 2) to conference call provider 103 (FIGS. 1 and 2) and transmits the PIN provided by the local caller 111 in step 405. Control then proceeds to a "Connection Established?" step 411. If in step 411, the conference call provider 103 determines that the PIN entered by the local caller 111 does not correspond to a particular conference call, then the connection to the conference call provider fails and control proceeds to a "Too Many Tries?" step 415 in which process 400 determines whether the local caller 111 has had enough opportunities to enter, or input, a valid PIN. If a predetermined number of PIN entry failures has occurred, then control proceeds to a "Notify Caller" step 417 in which the local caller is informed of their failure to be validated and added to the requested conference call. Control then returns to step 401 in which the PBX 201 continues to process additional calls.

If in step 411 the conference call provider 103 determines that a valid PIN has been input, then the local caller 111 is connected to the respective conference call and the conference call commences. Control then proceeds to a "Store PIN" step 413 in which the PBX 201 stores in memory, in conjunction with the conference call number that is already in memory, the valid PIN. Process 400 then returns control to step 401 and the processing of calls continues.

If in step 415 process 400 determines that local caller 111 should be given another opportunity to input a valid PIN, then control returns to step 405 and process 400 continues as explained above.

If in step 407 the received call is not the first call to a particular conference call number and PIN, i.e. the PIN has already been stored in memory in conjunction with the particular conference call number, then control proceeds to a "Multiplex Connection" step 419 in which the local caller is added to connection 213, established in steps 409 and 411. In this manner, single connection 213 is employed for multiple callers 111. From step 419, control proceeds back to step 401 in which incoming calls to the PBX 201 continue to be processed as explained above.

While the invention has been shown and described with reference to particular embodiments thereof, it will be understood by those skilled in the art that the foregoing and other changes in form and detail may be made therein without departing from the spirit and scope of the invention, including but not limited to different switch configurations, different conference call configurations and additional, less or modified steps performed in the same or a different order.

We claim:

1. A method for consolidating multiple telephone connections to an off-site conference call, via a given location, into a single connection, comprising the steps of:
   storing a list of at least one telephone number, each number on the list corresponding to an off-site conference call;
   filtering incoming telephone calls to identify incoming telephone calls with a destination number corresponding to a number on the list;
   grouping the identified incoming telephone calls; and
   multiplexing the grouped telephone calls into a single connection to the destination telephone number.

2. The method of claim 1, the multiplexing step comprising the steps of:
   establishing a connection to the destination telephone number for a first identified telephone call of the identified incoming calls; and
   connecting at least one subsequent identified telephone call via the connection.

3. The method of claim 1, further comprising the step of:
   storing a personal identification number (PIN) corresponding to a first identified call of the identified incoming call; and wherein
   the grouping and multiplexing steps are executed based upon a correspondence between the PIN and a second PIN input with at least one subsequent telephone call of the identified incoming calls.

4. The method of claim 1, wherein the steps are executed on a local branch exchange (PBX).

5. The method of claim 1, wherein the destination telephone number corresponds to a conference call provider at the off-site location.

6. The method of claim 1, wherein at least one of the incoming telephone calls is received at a computer via a network and the steps are executed on the computer.

7. The method of claim 6, wherein the network is the Internet and the at least one incoming telephone call is in an Internet protocol (IP) format.

8. A telephone switch, comprising:
   memory;
   a list of at least one telephone number, each number corresponding to a particular conference call hosted at a remote location, stored in the memory;
   logic for filtering incoming telephone calls to identify a plurality of calls with a destination number corresponding to a particular telephone number on the list;
   logic for grouping the plurality of calls; and
   logic for multiplexing the group of identified calls into a single connection to the destination number.

9. The telephone switch of claim 8, the logic for multiplexing comprising:
   logic for establishing a connection to the destination telephone number for a first identified telephone calls of the identified incoming calls; and
   logic for connecting subsequent identified telephone calls via the connection.

10. The telephone switch of claim 8, further comprising:
    logic for inputting into the memory a designated personal identification number (PIN) corresponding to a first identified incoming telephone call; and
    logic for grouping at least one subsequent identified incoming telephone call based upon the PIN and a corresponding PIN input with the least one subsequent telephone call.

11. The telephone switch of claim 8, wherein the switch is a local branch exchange (PBX).

12. The telephone switch of claim 8, wherein the destination telephone number corresponds to a conference call provider at the remote location.

13. The telephone switch of claim 1, wherein the switch is implemented in a computer and at least one of the incoming telephone calls is received at the computer via a network.

14. The method of claim 13, wherein the network is the Internet and the at least one incoming telephone call is in an Internet protocol (IP) format.

15. A computer program product for consolidating multiple telephone connections to an off-site conference call, via a given location, into a single connection, comprising:
    means, recorded on the recording medium, for storing a list of at least one telephone number, each number on the list corresponding to a conference call;
    means, recorded on the recording medium, for filtering incoming telephone calls to identify incoming telephone calls with a destination number corresponding to a number on the list;
    means, recorded on the recording medium, for grouping the identified incoming telephone calls; and means, recorded on the recording medium, for multiplexing the grouped telephone calls into a single connection to the destination telephone number.

16. The computer program product of claim 15, the multiplexing means comprising:
  means, recorded on the recording medium, for establishing a connection to the destination telephone number for a first identified telephone call of the identified incoming calls; and
  means, recorded on the recording medium, for connecting subsequent identified telephone calls via the connection.

17. The computer program product of claim 15, further comprising:
  means, recoded on the recording medium, for inputting and storing on the recording medium a personal identification number (PIN) corresponding to a first identified telephone call of the identified incoming calls;
  means, recorded on the recording medium, for grouping at least one subsequent call of the identified incoming calls based upon the PIN and a corresponding PIN input in conjunction with the at least one subsequent call.

18. The computer program product of claim 15, wherein the steps are executed on a local branch exchange (PBX).

19. The computer program product of claim 15, wherein the destination telephone number corresponds to a conference call provider at the off-site location.

20. The computer program product of claim 15, wherein at least one of the incoming telephone calls is received at a computer via a network and the steps are performed on the computer.

21. The computer program product of claim 20, wherein the network is the Internet and the at least one incoming telephone call is in an Internet protocol (IP) format.

* * * * *